United States Patent [19]

Motoori et al.

[11] Patent Number: 4,651,226

[45] Date of Patent: Mar. 17, 1987

[54] IMAGE SCANNING SIGNAL GENERATING APPARATUS WITH PRE-SCAN FOR EXPOSURE CONTROL

[75] Inventors: Ryuzo Motoori, Kawasaki; Makoto Kimura, Tokyo; Masaki Isogai, Tokyo; Akimasa Sato, Tokyo; Atsushi Kawahara, Kawasaki, all of Japan

[73] Assignees: Kyodo News Service; Nippon Kogaku K. K., both of Tokyo, Japan

[21] Appl. No.: 661,829

[22] Filed: Oct. 17, 1984

[30] Foreign Application Priority Data

Oct. 24, 1983 [JP] Japan .................. 58-198745

[51] Int. Cl.[4] ................. H04N 1/10; H04N 3/04
[52] U.S. Cl. ................... 358/293; 358/228; 358/288; 250/229; 350/269
[58] Field of Search ............ 358/228, 202, 293, 294, 358/288, 280; 250/201, 229; 350/269; 354/429, 430, 432

[56] References Cited

U.S. PATENT DOCUMENTS

| | | | |
|---|---|---|---|
| 3,624,291 | 11/1971 | Miyata | 178/7.6 |
| 3,804,976 | 4/1974 | Gard | 178/6.8 |
| 3,931,464 | 1/1976 | Murase | 358/288 |
| 4,158,859 | 6/1979 | Kerbel | 358/288 |
| 4,255,764 | 3/1981 | Howe | 358/214 |

Primary Examiner—James J. Groody
Assistant Examiner—John K. Peng
Attorney, Agent, or Firm—Shapiro and Shapiro

[57] ABSTRACT

An image signal generating apparatus includes an optical system for focusing the image of a photographic film onto a predetermined plane and a scanning device for scanning the image with a photoreceptor positioned at the predetermined plane and generating output signals representing the light intensity distribution of the film. The scanning device performs a first scan of the image and a second scan of the image upon completion of the first scan. During the first scan the levels of the output signals indicative of the maximum density and the minimum density of the film are detected, and during the second scan the exposure of the photoreceptor is controlled in accordance with the detected levels. Also, during the second scan, the output signals are clamped to a clamp level calculated in accordance with the detected maximum density level and the minimum level of the output signals during the first scan.

7 Claims, 9 Drawing Figures

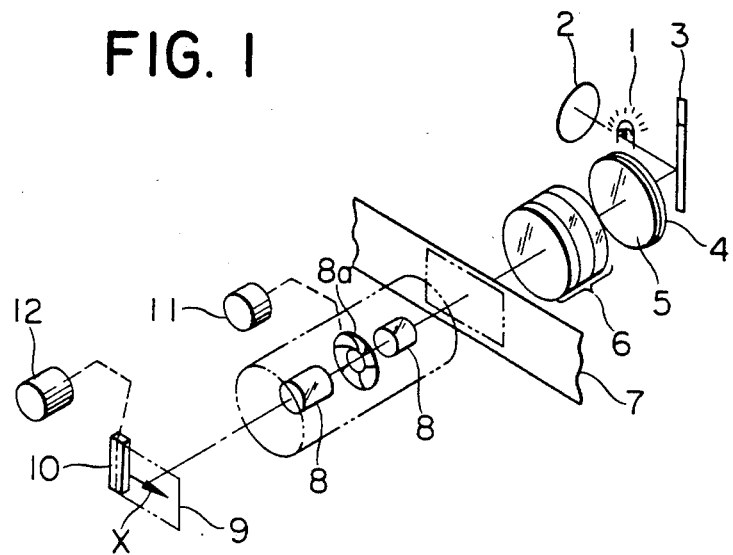
FIG. 1
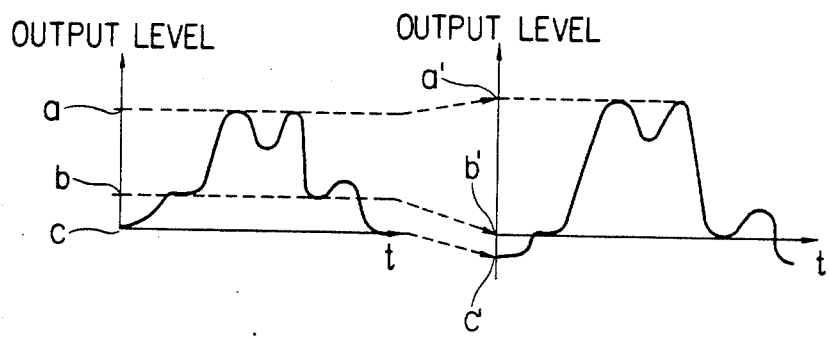
FIG. 3
FIG. 4
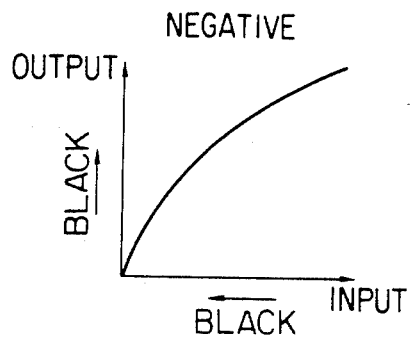
FIG. 5
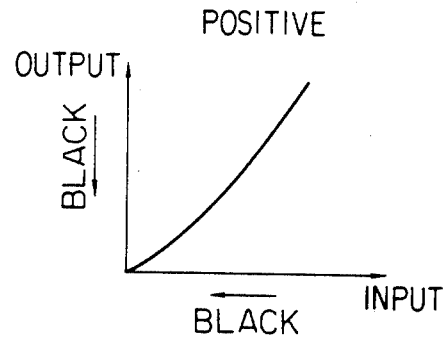
FIG. 6

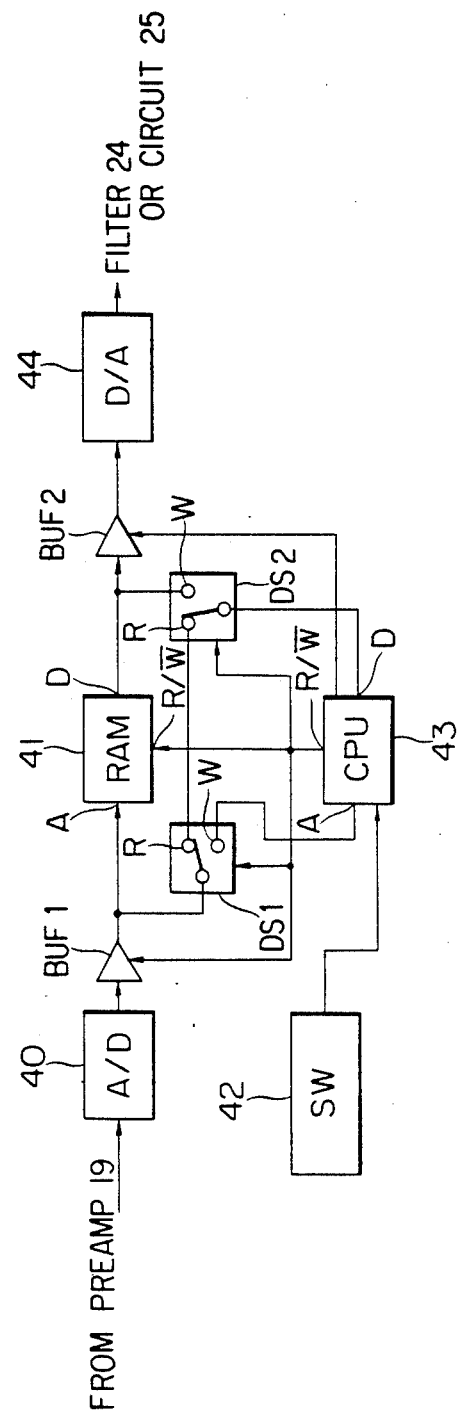
FIG. 7
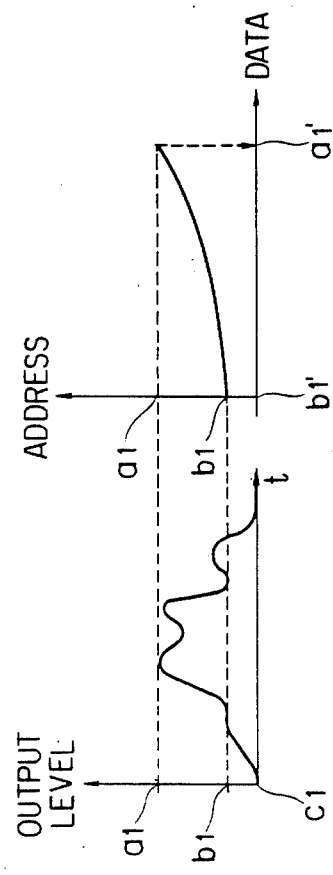
FIG. 8
FIG. 9

IMAGE SCANNING SIGNAL GENERATING APPARATUS WITH PRE-SCAN FOR EXPOSURE CONTROL

BACKGROUND OF THE INVENTION

1. Field of the Invention

The present invention relates to an image scanning apparatus in which a linear image sensor performs mechanical scanning in a direction perpendicular to the longitudinal direction of said sensor, and more particularly to such scanning apparatus adapted for use in the image signal generation in a telephoto or facsimile transmitter.

2. Description of the Prior Art

In a conventional telephoto or facsimile transmitter, a photoelectric converting element is linearly moved parallel to the axis of a rotary drum on which a photograph is wound, thereby achieving a scanning with the photoelectric converting element in combination with the drum rotation (hereinafter called horizontal scanning) and a scanning with said element in combination with the axial movement thereof (hereinafter called vertical scanning).

In such system it is difficult to exactly measure the density information of the object photograph in a short time by preliminary scanning of the entire photograph, since the horizontal scanning is conducted by mechanical rotation of the drum, which revolution cannot be made very high.

Also such rotary drum system is associated with a drawback of requiring a complicated structure for a transmissive object such as a photographic film, since an illuminating optical system and a photodetector have to be positioned across the drum made of a transparent material, namely inside and outside thereof, and have to be linearly moved in synchronism along the rotary axis thereof to achieve vertical scanning. In addition, for a small film such as of 35 mm format, there are required a high precision for the movement in the vertical scanning direction and a high resolving power in the horizontal scanning direction.

Furthermore, the image scanning apparatus for the telephoto transmitter employing a photograph wound on a rotary drum requires a long time for the preparation for transmission because of darkroom operations such as enlarging, trimming, printing and developing for printing a photograph from a photographic film, and the place of transmission is therefore inevitably limited. Besides the presence of a printing step onto the photographic paper from the film inevitably gives rise to a loss of the image information contained in the original film, such as a deterioration of the resolving power and of delicate tonal rendition.

SUMMARY OF THE INVENTION

In consideration of the foregoing, an object of the present invention is to prevent the aforementioned drawbacks, and is to provide a photoelectric converting apparatus for converting light transmitted by a film into electrical signals, and for providing electrical signals of a determined range from films of various exposure conditions.

The apparatus of the present invention is featured by detecting the minimum image density (area closest to transparent) and the maximum image density (darkest area) recorded on a negative or positive film from the maximum and minimum values of light transmission through the film, setting the level of the electrical signal obtained by photoelectric conversion of the transmitted light of said minimum density area within a predetermined range by controlling the diaphragm aperture of an optical system or the gain of an amplifying circuit, and by normalizing the level of electrical signal obtained by photoelectric conversion of the transmitted light of said maximum density area into a predetermined range through a DC level shifting in a clamp circuit.

BRIEF DESCRIPTION OF THE DRAWINGS

FIG. 1 is a schematic view of a telephoto transmission system employing a photographic film;

FIGS. 3 and 8 are wave form charts showing image signals of a horizontal scanning line obtained from the linear sensor in preliminary scanning;

FIG. 4 is a wave form chart showing image signals of a horizontal scanning line obtained according to the present invention;

FIG. 5 is a chart showing gamma characteristic of a negative film;

FIG. 6 is a chart showing gamma characteristic of a positive film;

FIG. 7 is a block diagram showing another embodiment; and

FIG. 9 is a chart showing gamma characteristic.

DETAILED DESCRIPTION OF THE PREFERRED EMBODIMENTS

Figure 2:
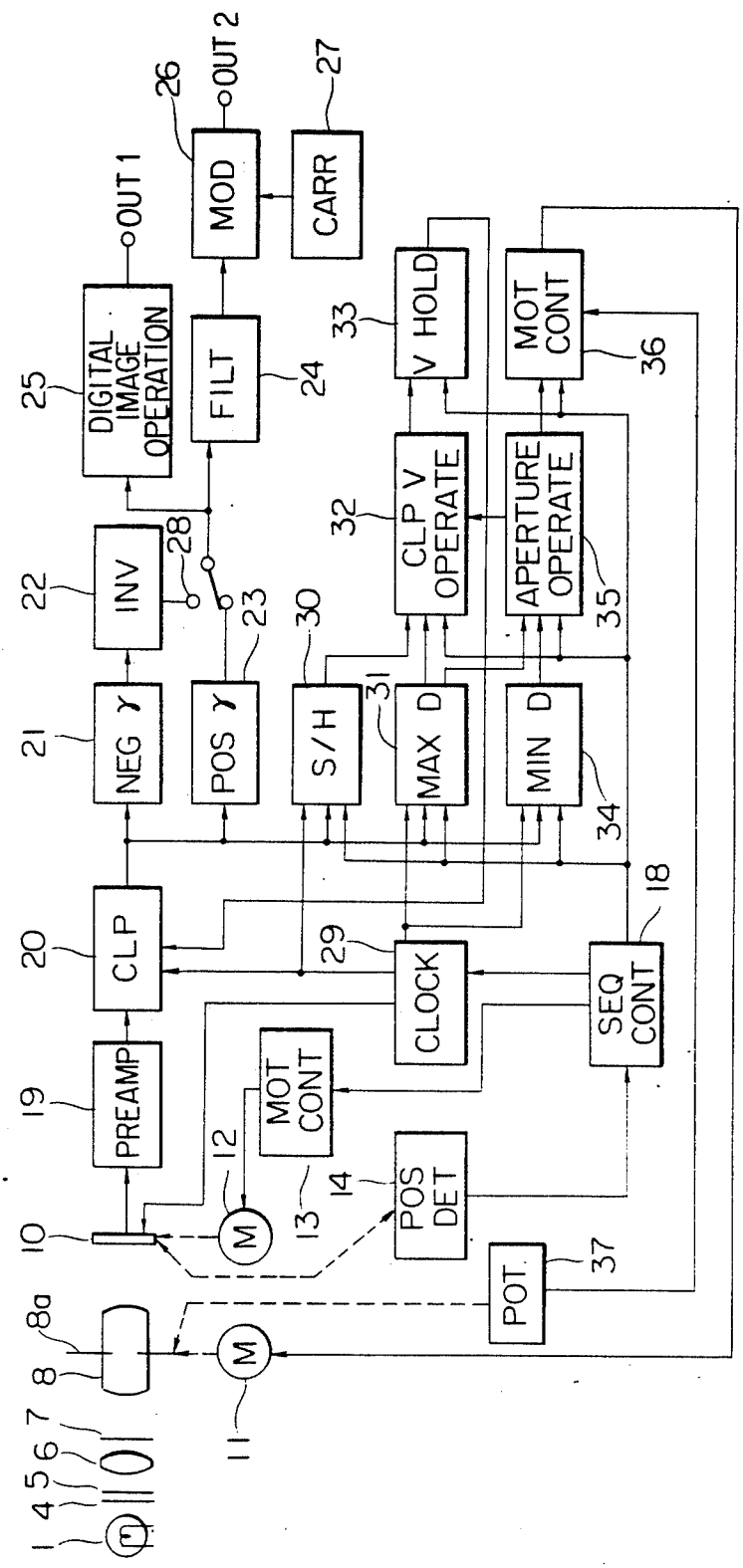
FIG. 2 is a block diagram showing an embodiment of the present invention.

FIG. 1 is a schematic view of a telephoto transmitter employing a photographic film, in which the image scanning apparatus of the present invention is applicable.

The optical system of the present invention is constructed in such a manner that the light of a determined intensity continuously emitted from a light source 1 illuminates a developed photographic film 7 through a concave mirror 2, a planar mirror 3, an infrared absorbing filter 4, a diffusing plate 5 and condenser lenses 6, and the image of said film 7 is focused on a focal plane 9 through an imaging optical system 8. A CCD linear image sensor 10 is so positioned as to scan said focal plane 9. A diaphragm driving motor 11 controls a diaphragm 8a of the imaging optical system 8, and a scanning drive motor 12 moves the image sensor 10 in the direction of the arrow on the focal plane 9. The longitudinal scanning of the CCD linear image sensor 10 corresponds to the horizontal scanning, while the scanning motion in the direction X of the image sensor 10 caused by the motor 12 corresponds to the vertical scanning.

The light beam from the light source 1 is reflected by the concave mirror 2 and the planar mirror 3, then transmitted by the infrared absorbing filter 4 and the diffusing plate 5, and concentrated by the condenser lens 6 to uniformly illuminate the entire frame area of the film 7. The light transmitted by the film 7 is focused by the imaging optical system 8 onto the focal plane 9 and is converted into electrical signals by means of the image sensor 10 scanning said focal plane. The film 7 is rendered movable horizontally and vertically, and the imaging optical system 8 is capable of zooming.

FIG. 2 is a block diagram of an embodiment of a telephoto transmitter employing a photograph as shown in FIG. 1 in which the present invention is applied. In FIG. 2, the same components as those in FIG. 1 are represented by the same numbers and will not be explained further. A sequence controller 18 controls the operation sequence of the transmitter, and controls the rotation of the motor 12 through a motor control circuit 13 in response to the positional information of the image sensor 10 in the direction X detected by a position detector 14. A pre-amplifier 19 amplifies the analog electrical signals from the image sensor. A clamp circuit 20 is provided to shift the DC level of the signals from the pre-amplifier 19. A negative film gamma correcting circuit 21, an inverting circuit 22 and a positive film gamma correcting circuit 23 are controlled by a selector switch 28. A filter 24 modifies the signals transmitted through the switch 28 to match with the frequency band of a telephone line. A digital image signal processing circuit 25 is provided for example for image processing with a computer. A modulator 26 performs AM or FM modulation of a carrier generated from a carrier signal generator 27 with the image signals obtained through the line filter 24 for image transmission through the telephone line. There are further provided a clock generator 29 for generating clock signals for sequence control of the apparatus; a sample hold circuit 30 for detecting optical black level; a maximum density detecting circuit 31 for detecting the maximum density value in the film image in a high-speed scanning (hereinafter called pre-scanning) preceding the scanning for photoelectric conversion for signal transmission through the telephone line or for digital image processing (hereinafter called main scanning); a minimum density detecting circuit 34 for detecting the minimum density value of the most transparent area in the film image in the pre-scanning; a diaphragm aperture calculating circuit 35 for calculating the optimum diaphragm aperture from the outputs of the maximum density detecting circuit 31 and the minimum density detecting circuit 34; a motor control circuit 36 for controlling the rotation of the diaphragm drive motor 11 in response to the output of the diaphragm aperture calculating circuit 35; and a potentiometer 37 for moving a brush to regulate resistance according to the diaphragm aperture of the diaphragm 8a. The output of the potentiometer 37 is fed to said motor control circuit 36 to form a feedback control loop for the diaphragm 8a. A clamp voltage calculating circuit 32 calculates a clamp voltage from the outputs of the sample hold circuit 30, maximum density detecting circuit 31 and diaphragm aperture calculating circuit 35 to regulate the output level of the minimum density in the main scanning to a standard level. A voltage hold circuit 33 holds the output voltage of said clamp voltage calculating circuit during the pre-scanning and main scanning and supplies said voltage to the clamp circuit 20.

FIG. 3 is a wave form chart of the image signals of a horizontal scanning line obtained from the linear sensor in the pre-scanning for detecting the maximum and minimum densities of the film employed, and FIG. 4 is a wave form chart of the image signals of a horizontal scanning line obtained in the main scanning according to the present invention.

FIG. 5 is a chart showing an example of the gamma characteristic of the negative gamma correcting circuit 21 in case a negative film is loaded, and FIG. 6 is a chart showing an example of the gamma characteristic of the positive gamma correcting circuit 23 in case a positive film is loaded.

In the following there will be given an explanation on the function of the telephoto transmitter for film shown in FIG. 2, while making reference to FIGS. 3 and 4.

Prior to the pre-scanning, the sequence controller 18 supplies a signal to the motor control circuit 36 in such a manner as to preset the aperture of the diaphragm 8a to a determined value. In this manner the saturation of the output of the linear sensor 10 can be prevented for a film of any density distribution. Then, again prior to the pre-scanning, the sequence controller 18 causes the clock pulse generator 29 to supply clock pulses to the sample hold circuit 30, thereby causing said circuit to detect the output level of a light-shielded photodiode (hereinafter called optical black photodiode) of the linear sensor 10. The clamp voltage calculating circuit 32 determines a voltage, taking the output level from the optical black photodiode as the reference level (level C=0(v) in FIG. 3), and the voltage hold circuit 33 holds the voltage determined by said calculating circuit 32 and continues to supply said voltage to the clamp circuit 20 during the pre-scanning. The pre-scanning allows detection, by the maximum density detecting circuit 31 and the minimum density detecting circuit 34, of the maximum and minimum densities respectively of the loaded film. FIG. 3 shows the minimum density level a and the maximum density level b. Then the position detector 14 determines the completion of the pre-scanning of the image sensor 10. Upon completion of the pre-scanning, in response to the minimum and maximum density levels a, b determined by the maximum density detecting circuit 31 and by the minimum density detecting circuit 34, the clamp voltage calculating circuit 32 and the diaphragm aperture calculating circuit 35 calculate an aperture and a clamp voltage in such a manner that the minimum and maximum levels in the main scanning become respectively equal to the predetermined minimum and maximum density levels a', b' shown in FIG. 4. The minimum density detecting circuit 34 may be composed of a peak-hold circuit.

The correction for the diaphragm aperture is determined by $(a'-b')/(a-b)$ wherein $b'=0$, namely by $a'/(a-b)$, and the positional information is fed back by the potentiometer 37 linked with the diaphragm 8a to control the diaphragm through the control circuit 36, whereby the minimum density level (level a in FIG. 3) of the loaded film is set as the reference level (level a' in FIG. 4). Also the clamp voltage calculating circuit 32 generates the clamp voltage according to a formula $-(b-c)\times(a'-b')/(a-b)$ wherein $c=0$, $b'=0$, namely by a formula $-b\times a'/(a-b)$, and the voltage hold circuit 33 continues to supply said clamp voltage to the clamp circuit 20 during the main scanning.

In response to the clamp pulse from the clock generator 29, the clamp circuit 20 receives the clamp voltage from the voltage hold circuit 33 and sets the maximum density level (level b in FIG. 3) of the loaded film as the reference level (level b' in FIG. 4) during the main scanning. In this manner the electrical image signals can be normalized within a determined level range for the film of any exposure status. Upon completion of the calculation of the clamp voltage and the diaphragm aperture, the sequence controller 18 effects the main scanning, and the image signals obtained in said main scanning are supplied through the pre-amplifier 19 and the clamp circuit 20 and subjected to correction of gamma or contrast characteristics, either in the negative gamma correction circuit 21 of the gamma characteristic shown in FIG. 5 in case of a negative film followed by inversion of polarity in the inverting circuit 22, or in the positive gamma correcting circuit 23 of the gamma characteristic shown in FIG. 6 in case of a positive film, according to the selection by the switch 28. The output signals of the inverting circuit 22 or the positive gamma correcting circuit 23 supplied through the switch 28 are supplied to the digital image processing circuit 25 for generating digital image signals suitable for computer processing etc. and to the telephone line filter 24. The output signals of said filter 24 effect AM or FM modulation of the carrier from the carrier signal generator 27 by means of a telephone line modulator 26, and the obtained signals are released from an output terminal OUT2 for the telephone line. Also the output signals of the image processing circuit 25 are released from an output terminal OUT1.

Each of the gamma correcting circuits 21, 23 has plural gamma correcting characteristics, but the number of such correcting characteristics can be reduced since the input electrical signals are contained within a determined level range. The minimum density detecting circuit 34 holds the maximum peak in the output signals of the linear sensor 10 in each horizontal scanning line in the pre-scanning. On the other hand, the maximum density detecting circuit 31 holds the minimum peak in the output signals of the linear sensor 10 during a predetermined period not affected by the optical black photodiode in each horizontal scanning line.

FIG. 7 is a block diagram showing the principal part of another embodiment, FIG. 8 is a wave form chart similar to FIG. 3, showing the image signals of a line obtained from the linear sensor in the pre-scanning, and FIG. 9 is a chart showing the gamma characteristic for gamma correction.

The circuit shown in the block diagram of FIG. 7 is to replace a part of the circuit shown in FIG. 2 representing the present invention, and is to be inserted between the pre-amplifier 19 and the digital image processing circuit and filter 24 shown in FIG. 2.

The circuit shown in FIG. 7 comprises an AD converter 40; buffer amplifiers BUF1, BUF2; a random access memory 41; data selectors DS1, DS2; a positive/negative film selector switch 42; and a micro computer 43 including a central processing unit. There are further shown a read/write port R/W; a contact R to be selected at data read-out; a contact W to be selected at data write-in; an address port A; and a data port D. The D-A converter 44 converts the digital output signals of the buffer amplifier BUF2 into analog signals. In the present embodiment the gamma correction curve is regulated to obtain a constant amplitude in the image signals. The function of the present embodiment is as follows.

At the pre-scanning, the output signals from the pre-amplifier 19 are converted into digital signals by means of the A-D converter 40. At said pre-scanning, the data selectors DS1, DS2 are both positioned at the contacts R by the CPU 43. Consequently the digitally converted image signals are supplied to the data port D of the CPU 43. In this state the port R/W of the CPU 43 assumes the high-level state to deactivate the buffer amplifier BUF2. Through the pre-scanning the CPU 43 detects the maximum and minimum densities of the entered image signals, namely the levels b1, a1 in FIG. 8, and determines a gamma correction curve for obtaining data b1, a1' shown in FIG. 9. The address and data of the thus determined gamma correction curve are supplied to the random access memory 41. At this state the data selectors DS1, DS2 are shifted to the contacts W, whereby the port R/W of the CPU assumes the low-level state to deactivate the buffer BUF1. The address and data are supplied from the address port A and data port D of the CPU to the random access memory to store the gamma correction curve therein.

In the succeeding main scanning, the CPU turns on the buffers BUF1, BUF2, whereby the output signals of the A-D converter 40 are supplied to the address port A of the random access memory, and the data port D releases the data processed according to thus determined gamma correction.

Instead of the linear sensor in the foregoing embodiment there can naturally be employed a two-dimensional sensor, in which case the scanning drive motor 12 can be dispensed with.

We claim:

1. Apparatus for generating picture signals having an optical system for forming an image of a developed photographic film on a predetermined plane and scan means for scanning said image by a light-receiving surface disposed on said predetermined plane and generating an output indicative of the light intensity distribution of said image on said plane, the apparatus comprising:
   (a) driving means for driving said scan means relative to said image to perform a first scan and a second scan, said driving means performing said second scan in response to the completion of said first scan;
   (b) means for detecting the level of said output indicative of the maximum density of said developed photographic film in accordance with said output generated during said first scan and for producing a maximum density signal;
   (c) means for detecting the level of said output indicative of the minimum density of said developed photographic film in accordance with said output generated during said first scan and for producing a minimum density signal;
   (d) means for detecting the minimum level of said output generated during said first scan and for producing a detection signal;
   (e) control means for controlling the exposure of said light-receiving surface during said second scan in accordance with said maximum density signal and said minimum density signal;
   (f) clamp means for clamping said output during said second scan; and
   (g) means for calculating a clamp level in accordance with said maximum density signal and said detection signal, said clamp means clamping said output during said second scan in accordance with said clamp level.

2. An apparatus according to claim 1, wherein said control means controls the exposure of said light receiving surface so that the maximum level of said output generated during said first scan is substantially equal to the maximum value of a predetermined range and said clamp means clamps said output generated during said second scan so that the minimum level of said output generated during second scan is substantially equal to the minimum value of said predetermined range.

3. An apparatus according to claim 2, wherein said optical system comprises a diaphragm and said control means controls said diaphragm in accordance with said maximum density signal and said minimum density signal.

4. An apparatus according to claim 2, wherein said clamp means sets the level of said output indicative of the maximum density of said film as a predetermined level.

5. Apparatus for generating picture signals having an optical system for forming an image of a developed photographic film on a predetermined plane and scan means for scanning said image by a light-receiving surface disposed on said predetermined plane and generating an output indicative of the light intensity distribution of said image on said plane, the apparatus comprising:
(a) driving means for driving said scan means relative to said image to perform a first scan and a second scan, said driving means performing said second scan in response to the completion of said first scan;
(b) control means for detecting two levels of said output which indicate the maximum density and the minimum density of said developed photographic film, respectively, in accordance with said output generated during said first scan, said control means producing data in accordance with said detected two levels and converting said output generated during said second scan in accordance with said data so that the level of said converted output indicative of the maximum density is substantially equal to the minimum value of a predetermined range and the level of said converted output indicative of the minimum density is substantially equal to the maximum value of said predetermined range; and
(c) output means for outputting said converted output.

6. An apparatus according to claim 5, wherein said control means comprises memory means, means for storing said data in said memory means, and means for reading said data stored in said memory means in response to said output generated during said second scan, and said output means outputs said data read by said control means.

7. Apparatus for generating picture signals of an image of a developed photographic film comprising:
(a) means for forming the image of said developed photographic film on a predetermined plane;
(b) a linear image sensor having a plurality of photoelectric conversion elements and a light receiving surface which is disposed on said predetermined plane, said linear image sensor generating an output indicative of the light intensity distribution of said light receiving surface, at least one of said plurality of photoelectric conversion element being light-shielded;
(c) driving means for driving said linear image sensor relative to said image to perform a first scan and a second scan, said driving means performing said second scan in response to the completion of said first scan;
(d) means for detecting the level of said output indicative of the maximum density of said developed photographic film in accordance with said output generated during said first scan and for producing a maximum density signal;
(e) means for detecting the level of said output indicative of the minimum density of said developed photographic film in accordance with said output generated during said first scan and for producing a minimum density signal;
(f) means for detecting the minimum level of said output generated during said first scan and for producing a detection signal;
(g) control means for controlling the exposure of said light receiving surface during said second scan in accordance with said maximum density signal and said minimum density signal;
(h) clamp means for clamping said output during said second scan; and
(i) means for calculating a clamp level in accordance with said maximum density signal and said detection signal, said clamp means clamping said output during said second scan in accordance with said clamp level.

* * * * *